June 16, 1964 D. SHEFFET 3,137,817

V.L.F. RADIO RECEIVER

Filed July 13, 1962 2 Sheets-Sheet 1

DAVID SHEFFET,
INVENTOR.

BY HIS ATTORNEYS.

Spensley & Horn.

V.L.F. RADIO RECEIVER

Filed July 13, 1962

2 Sheets-Sheet 2

DAVID SHEFFET,
INVENTOR.

By His Attorneys.
Spensley & Horn.

3,137,817
V.L.F. RADIO RECEIVER

David Sheffet, Altadena, Calif., assignor to Western Geophysical Company of America, Los Angeles, Calif., a corporation of Delaware Filed July 13, 1962, Ser. No. 209,635
14 Claims. (Cl. 325—340)

This invention relates to very low frequency radio receivers and more particularly to a portable, highly directional receiver of this type.

Prior art V.L.F. (i.e., in the range from 3 to 30 kc.) radio receivers are generally relatively large and bulky, require substantial amounts of power, and are not as directionally sensitive as is sometimes desired. The present invention V.L.F. radio receiver, by making use of a novel combination of transistor stages, together with a directional ferrite core antenna coil, provides a small, lightweight, highly directional V.L.F. receiver with very low power requirements.

Due to the extremely long wave length of V.L.F. signals, it is generally difficult, if not impossible, to determine the source of a received V.L.F. signal. It is partly for this reason that naval vessels, especially submarines, in order to avoid detection, employ very low frequency transmission for radio communication purposes. In the case of the submarine, only V.L.F. waves will penetrate salt water. The present invention receiver, when used with a wire wound ferrite core antenna, as herein described, has been found to offer such extreme directional sensitivity that it serves as an aid in the determination of the source of received V.L.F. signals under certain circumstances.

It is therefore an object of the present invention to provide an improved V.L.F. radio receiver.

It is also an object of the present invention to provide a transistorized V.L.F. receiver which has substantially smaller power requirements and which is more compact than present art V.L.F. receivers.

It is another object of the present invention to provide a V.L.F. radio receiver which is highly directionally sensitive.

A further object of the present invention is to provide an extremely sensitive V.L.F. receiver.

Yet a further object of the present invention is to provide a V.L.F. receiver which will receive signals at a predetermined frequency from a distant station while rejecting a strong local signal whose frequency is close to that of the distant station.

A still further object of the present invention is to provide a V.L.F. receiver of the character described which has a considerably higher gain than prior art receivers.

The objects of the present invention are accomplished by a transistorized V.L.F. receiver circuit utilizing resistance coupling throughout and incorporating a ferrite core directional antenna. Sufficient selectivity is achieved through the use of a single frequency rejection filter in a negative feedback circuit. Heterodyne detection is accomplished by the combination of mixer, oscillator and filter stages.

The novel features which are believed to be characteristic of the present invention, together with objects and advantages thereof, will be better understood from the following description considered in connection with the accompanying drawings in which the invention is illustrated by way of example. It is to be expressly understood, however, that this description and the drawings are for the purposes of illustration and description only, and that the true spirit and the scope of the invention is defined by the accompanying claims.

Figure 1:
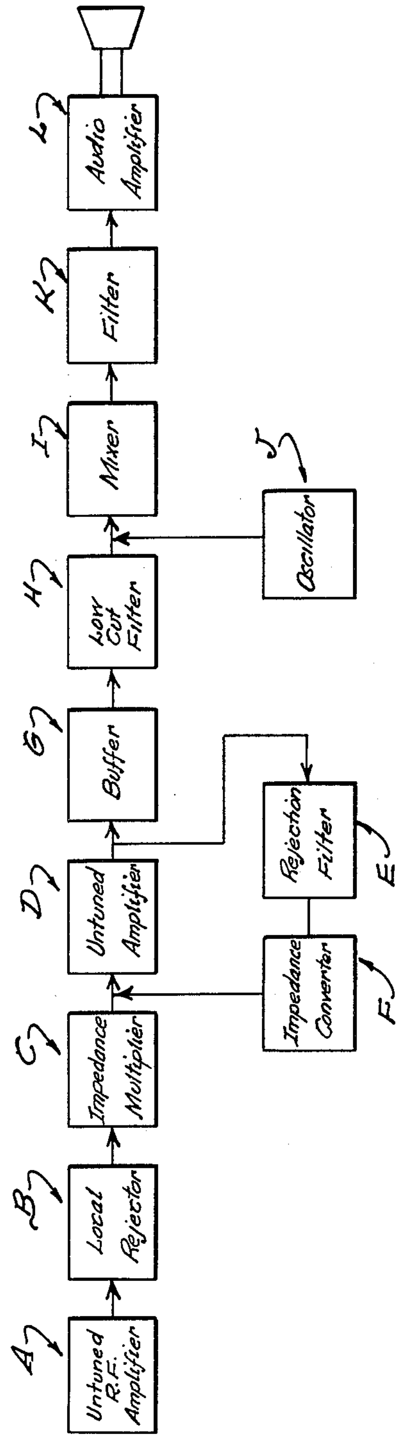
FIGURE 1 is a block diagram of the present invention V.L.F. radio receiver.

Referring now to the drawings, and specifically to FIGURE 1 thereof, there is shown a functional block diagram of the present invention V.L.F. receiver, the functional blocks being designated by the reference letters A–L. Incoming V.L.F. radio signals are received by an untuned radio frequency amplifier which is coupled to a ferrite core antenna coil as will be explained in further detail hereinbelow. The output of the untuned amplifier A is fed to a multi-stage resistance coupled amplifier D through a selectable rejector B and impedance matching stage C. The output of the amplifier D is fed to a buffer amplifier G and also inversely fed back to its input through a single frequency rejection filter E and impedance converter F. The output of the buffer amplifier G is fed to a low cut filter H and then to a mixer; the output of a local oscillator J is also fed to the input of the mixer I. The output of the mixer I is fed through a filter K to an audio amplifier L. The output of the audio amplifier L drives a loudspeaker or headphones.

V.L.F. radio signals picked up by the antenna coil of the R.F. amplifier A are amplifier and fed through the selectable rejector B and impedance matching stage C to the untuned amplifier stages of the amplifier D. The single frequency rejection filter E has a selectively curve approximately 1 kc. in width, and is tuned to the same frequency as the ferrite core antenna coil. The single frequency rejection filter E is connected to inversely feed back signals appearing at the output of the amplifier D while attenuating signals of the frequency to which the receiver is tuned. Due to the great attenuation of the signal frequency in the bridged T rejection network E there will be no significant inverse feedback of the signal frequency to the input stage of the amplifier D. Due to the elimination of the signal frequency from the inverse feedback voltage, the effect of the single frequency rejection filter E is to provide the amplifier D with a degree of selectivity comparable to that of a tuned amplifier, the inverse feedback effect serving to attenuate frequencies other than the signal frequency passing through the amplifier D. Thus, the signals fed to the buffer amplifier G will be signals of the frequency to which the receiver is tuned.

The untuned amplifier D has a fixed gain in the absence of the rejection filter E and impedance converter F. This gain is uniform with frequency. Normally, with the application of a filter E as shown in series with a feedback loop (consisting of the rejection filter and impedance converter), this gain is maintained at one desired frequency, but greatly reduced at all other frequencies. The inventor has discovered that by properly choosing the values of certain of the components in the rejection filter and impedance converter as will hereinafter be described, a threshold regeneration effect is produced which serves to increase the signal at the desired frequency by a factor of as much as 10–16 db over prior art receivers.

In accordance with the present invention circuit, the gain is reduced at all frequencies other than the one desired frequency. The gain at the desired frequency is not maintained but actually increased as mentioned hereinabove. The value of the capacitors 52, 67 and 59 as well as resistor 66 are chosen so as to cause a phase shift of the feedback voltage to produce the hereinabove mentioned positive feedback to produce the threshold regeneration effect. In accordance with the presently preferred embodiment of this invention the values of the condensers 52, 67 and 59 are 0.002 mfd., 0.1 mfd. and 0.1 mfd. and the value of the resistor 66 is 270K ohms. Thus, in accordance with the present invention circuit design above, the gain of a two stage amplifier at only one frequency can be increased greatly over the theoretical maximum gain obtained from the amplifier for a given set of load and voltage operating points. This increased gain has been found to be maintainable with great stability.

The local oscillator J is tuned to a predetermined frequency different from that of the receiver signal frequency so that when the oscillator and signal frequencies are combined in the mixer, the resulting heterodyne frequency will fall within the audio range. It is presently preferred to tune the oscillator to a frequency lower than that of the signal frequency to provide better receiver performance by enabling the use of a low pass filter which will effectively remove the signal and oscillator frequencies. Therefore, the filter H is of the low pass type having its cutoff frequency slightly above the desired heterodyne frequency so that all frequencies above the heterodyne frequency will be greatly attenuated. Thus, of the various frequencies presented to and generated within the receiver, only the desired heterodyne frequency will be fed to the audio amplifier.

Figure 2:
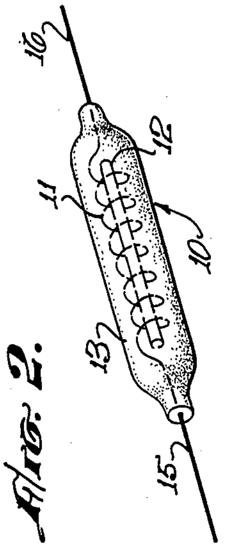
FIGURE 2 is a perspective view of the presently preferred antenna to be used with the present invention receiver.
Figure 3:
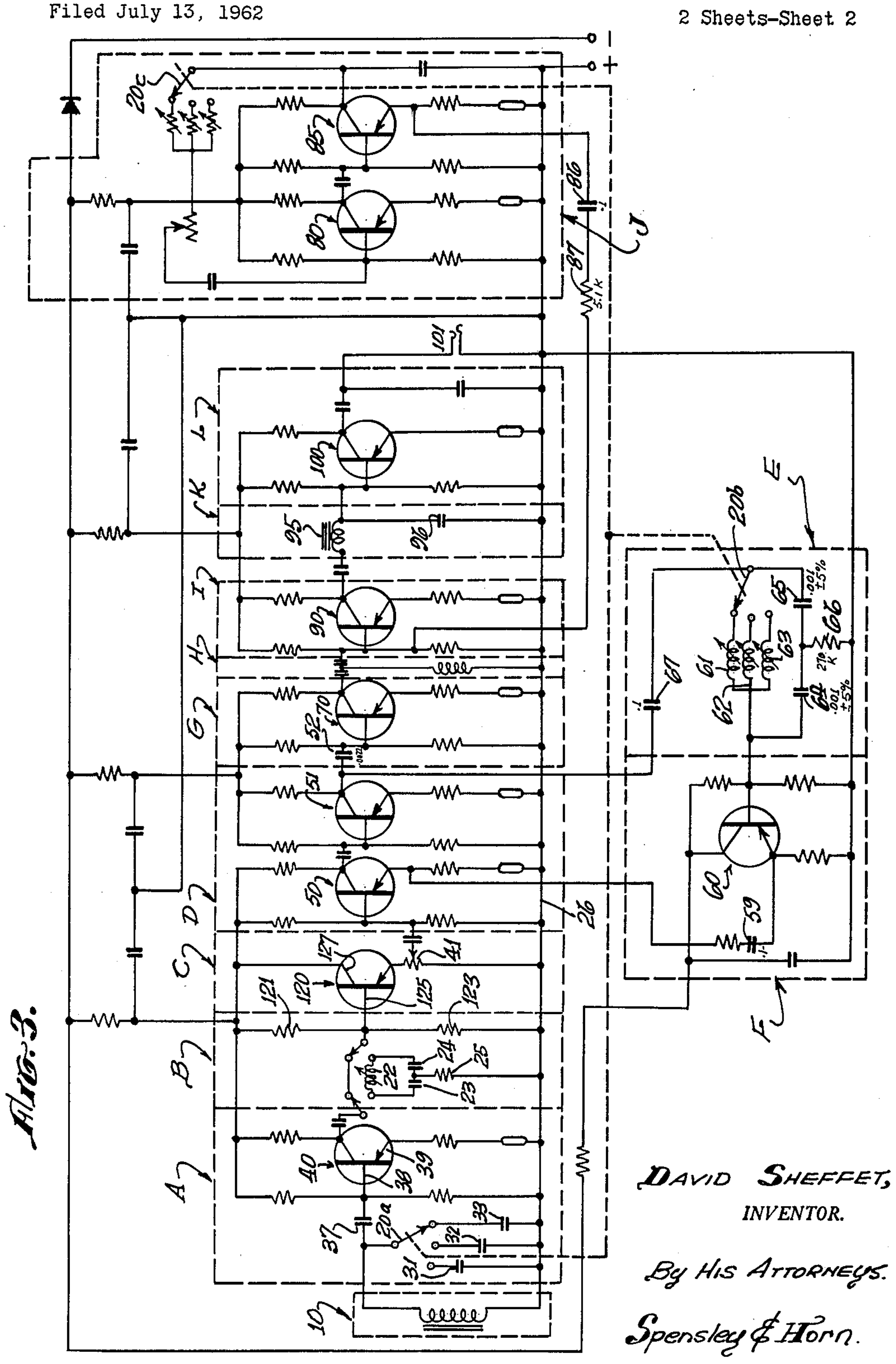
FIGURE 3 is a schematic circuit diagram of the presently preferred embodiment of the present invention receiver.

In FIGURES 2 and 3 of the drawing, there is shown suitable circuitry for the presently preferred embodiment of the V.L.F. radio receiver of FIGURE 1. The directional antenna is shown in FIGURE 2 and is generally indicated by the reference numeral 10. The antenna 10 consists of an antenna coil 11 wound on a ferrite rod 12 and encapsulated in a suitable electrical insulating material 13. It has a predetermined number of turns of wire on a ferrite core of predtermined size in order to have it tuned to the same frequency as filter E. While the antenna is shown in FIGURE 2 as having both ends of the windings extend from opposite ends of the core, they may both terminate at the same end. Additionally, it has been found desirable to have the outside wire go to the emitter 39 on the low potential side of transistor 40 while the inside end is coupled to the base 38 of the transistor through coupling capacitor 37. Electrical leads 15 and 16 are connected to the ends of the antenna coil 12 and project axially from the encapsulating material 13. The design of ferrite rod antennas is well known in the art and hence will not be discussed in detail.

Ferrite core antennas exhibit pronounced directional characteristics, receiving signals only transversely to the axis of the core with the core axis aligned in accordance with the polarization of the received signal. V.L.F. radio signals are horizontally polarized, hence a ferrite core antenna must be maintained with its axis substantially horizontal and transverse to the wave front of the signals. Thus, the use of a ferrite core antenna in the present invention portable V.L.F. receiver provides an important measure of directivity.

The ferrite core antenna 10 acts as the antenna coil of the receiver and is usually tuned to a desired signal frequency by the use of a shunting capacitor.

FIGURE 3 of the drawing shows a complete schematic diagram for the presently preferred embodiment of the V.L.F. radio receiver generally outlined in the block diagram of FIGURE 1. Dotted line enclosures are provided in FIGURE 3 to indicate the main blocks as outlined in FIGURE 1, with like reference letters referring to like blocks throughout. The receiver is selectively tunable to any one of three predetermined signal frequencies by a three position, three section switch 20, the switch sections being indicated by the sub-letters *a–c*. The switch section **20*a* in the R.F. amplifier A for the selective switching of capacitors 31, 32 or 33 in shunt with the ferrite core antenna 10 provides a tuned input for the receiver. Thus, signals of the desired signal frequency received by the antenna 10 are presented to a transistor amplifier utilizing a PNP transistor 40, connected in a self-biased common emitter configuration. The amplified signal output is fed to the selectable bridged-T rejector B and thence to the impedance multiplier C which produces the proper high terminating impedance for the rejector. The output of impedance multiplier C appears across potentiometer 41** which also acts as an emitter bias resistor.

Resistance coupling cannot be used between vacuum tube amplifiers at radio frequencies due to the relatively high interelectrode capacitance of vacuum tubes presenting an extremely low capacitive reactance at radio frequencies, the resulting low input impedance effectively reducing the gain to applied signals. However, the extremely low interelectrode capacitance inherent in semiconductor transistors results in a sufficiently high capacitive reactance at low radio frequencies to permit resistance coupling of transistor amplifier stages. The present invention V.L.F. receiver utilizes this advantage and only the antenna input of the receiver is tuned, the rest of the stages being untuned and resistance coupled throughout with the exception of the low cut filter H inserted between stages G and I.

The purpose of the adjustable coil rejector B between the amplifier A and amplifier D is to reduce the signal level of a very strong local station. In V.L.F. work there are transmitting stations that operate as high as one million to two million watts. When using a V.L.F. receiver in the vicinity of such a station, it is necessary to reduce the strong local signal early in the receiver to prevent overloading subsequent stages. This is particularly important when the gain control is wide open while the receiver is actually tuned to a weak distant station on an adjacent channel. The impedance multiplying stage C between the local rejector B and amplifier D permits a much higher terminating resistance on the rejector output than could be obtained by the normal input resistance of amplifier D. The high input impedance of the impedance multiplier stage makes possible a sharp and deep rejection notch to be obtained in the rejector. This produces maximum attenuation to a powerful local signal. In FIGURE 3 the local rejector is shown to consist of a T arrangement including variable inductor 22 and capacitors 23 and 24. A resistor 25 is connected to the positive line 26. The impedance multiplier in multiplying stage C includes a PNP transistor 120 and a voltage divider including two resistors 121 and 123. Resistor 121 is connected between the base 125 and the collector 127 of the transistor 120 while the resistor 123 is connected between the base 125 and line 26.

The untuned amplifier D consists of two stages of resistance coupled amplification utilizing PNP transistors 50 and 51 as the amplifying elements. The transistors 50 and 51 are connected in a self-biased, common emitter configuration, the transistor 50 being in the amplifier input stage and the transistor 51 being in the amplifier output stage. Coupled between the output and input stages of the untuned amplifier D are the single frequency rejection filter E and impedance converter F.

In the presently preferred embodiment, the single frequency rejection filter E is a bridged-T notch filter. Any one of three notch frequencies can be selected by means of the switch section **20*b*, the frequencies being identical to the three predetermined signal frequencies to which the receiver is tunable. The switch section 20*b* selects any one of three inductances 61, 62 or 63. Capacitors 64 and 65 are connected in series across the particular inductance selected by the switch section 20*b*. The bridged-T filter is completed by a resistor 66 connected between the point of common signal potential and the junction between the capacitors 64 and 65. The output of the bridged-T filter is fed through impedance converter stage F including PNP transistor 60 connected in the well-known emitter-follower configuration. The transistor 60 functions as an impedance converter to match the output impedance of the bridged-T filter to the emitter impedance of the transistor 50 in the input stage of the untuned amplifier D. Output signals from the untuned amplifier D are fed through a coupling capacitor 67 to the input of the bridged-T filter, from whence they are inversely fed back through the filter and the transistor 60 to the emitter of the transistor 50. By selectively tuning the bridged-T filter to the received signal frequency, signals of the frequency to which the receiver is tuned are effectively removed from the feedback voltage in accordance with the selectivity characteristics of the bridged-T filter. The bridged-T filter is selected to have a selectivity curve of a total width on the order of 1,000 cycles; the rejection or notch frequency being the receiver signal frequency. Due to the great attenuation of the receiver signal frequency in the notch filter and the resulting absence of the receiver signal frequency from the feedback voltage, signals of the frequency to which the receiver is tuned will pass unimpeded through the untuned amplifier D, while signals of all other frequencies will be attenuated by the inverse feedback voltage in accordance with the selectivity characteristics of the bridged-T filter. Hence, the untuned amplifier D in conjunction with the single frequency rejection filter C provides a measure of selectivity equivalent to that of a multi-stage tuned amplifier so that only signals at or near the receiver signal frequency are fed to the buffer amplifier G. The buffer amplifier G is a single stage of resistance coupled amplification, utilizing a PNP transistor 70** connected in a self-biased common emitter configuration. The output of the buffer amplifier G is fed to the mixer I through a low cut or high pass filter H which attenuates strong noise signals below the lowest V.L.F. signal to be received. These noise signals are created by nearby A.C. power sources of medium and high frequency.

The oscillator J in the presently preferred embodiment, is of the R-C feedback type, utilizing transistors 80 and 85. The oscillator J provides a local oscillator frequency which, when combined in the mixer with the receiver signal frequency will produce a heterodyne frequency within the audio range. Thus, the switch section 20*c* is positioned in the oscillator feedback loop to permit selection of any one of three oscillator frequencies in accordance with the particular receiver signal frequency then being utilized. In the presently preferred embodiment, a heterodyne frequency of about 1,000 cycles is chosen, and so the local oscillator is maintained 1,000 cycles below the particular receiver signal frequency. The oscillator frequency is selectively switched by means of the switch section 20*c*. It is therefore apparent that rotation of the switch 20 provides three main functions: the switch section 20*a* tunes the receiver input to the desired signal frequency; the switch section 20*b* tunes the rejection filter to the desired receiver signal frequency; and the switch section 20*c* tunes the local oscillator to a frequency of 1,000 cycles below the receiver signal frequency.

The output of the local oscillator is fed through an RC filter, consisting of a capacitor 86 and a resistor 87, to the input of the mixer I. The mixer I consists of a transistor amplifier utilizing a PNP transistor 90 connected in a self-biased common emitter configuration. The output signals from the buffer amplifier G passing through high pass filter H and the output signals of the local oscillator J are fed to the transistor 90, their combination providing the desired heterodyne frequency of 1,000 cycles. Thus, signals appearing at the output of the mixer I will contain components of the receiver signal frequency, the local oscillator frequency, together with the sum and difference frequencies formed by the heterodyning effect. If, for example, the receiver is tuned to a signal frequency of 20 kc., the local oscillator being tuned to 19 kc., there will appear at the output of the mixer I, signals of the following frequencies, 20 kc., 19 kc., 39 kc., and 1 kc. Since it is desired to amplify only the 1 kc. heterodyne frequency, the output of the mixer I is fed into the filter K which attenuates the undesired frequencies.

The filter K is of the low pass type utilizing a series inductor 95 and a shunt capacitor 96, the cutoff frequency of the low pass filter being slightly above 1 kc. so that 1 kc. signals will pass therethrough with a minimum of attenuation while signals of higher frequencies will be greatly attenuated. The output of the filter, consisting of the 1 kc. heterodyne signals which are interrupted or pulsed in accordance with the pulsing of the received V.L.F. signals, is fed to the audio amplifier L.

In the presently preferred embodiment, the audio amplifier L consists of a single stage of amplification utilizing transistor 100 connected in a self-biased common emitter configuration. The output of the audio amplifier L is coupled to a phone jack 101 through which can be connected a headphone or loudspeaker.

All of the transistors in the receiver are connected in the so-called common emitter configuration. Coupled in series with each of the emitter electrodes (with the exception of the impedance matching stages) is a sensistor to provide temperature compensation so that the output of each of the transistorized stages will remain relatively constant upon variations in ambient temperature.

Although the invention has been described with a certain degree of particularity, it is to be understood that the present disclosure has been made only by way of example, and that numerous changes in the operation and in the combination and arrangement of parts may be resorted to without departing from the spirit and the scope of the invention as hereinafter claimed. Although the particular circuitry of the illustrated embodiment utilizes a bridged-T filter for the single frequency rejection filter and a feedback oscillator for the local oscillator for example, other suitable filter and oscillator circuits, as well as other pertinent portions of the circuitry, will be apparent to those skilled in the art as suitable for use in the format illustrated in FIGURE 1 of the drawing.

Other changes which may be made without departing from the spirit of the invention is the elimination of stages B, C and H, all of which serve to improve the performance of the present invention amplifier, but which are not absolutely essential to its operation. Likewise, the multistage resistance coupled amplifier D may be replaced by a single stage amplifier.

What is claimed is:

1. A V.L.F. radio receiver comprising, in combination:

(*a*) a first untuned radio frequency amplifier, said amplifier having uniform ampilfication in the frequency range from 3–30 kc.;

(*b*) a second untuned amplifier coupled to the output of said first amplifier;

(*c*) a single frequency rejection filter having its input coupled to the output of said second amplifier, said filter being tuned to the frequency of the signal to be received, the output of said filter being coupled to a suitable point in the input of said second amplifier to inversely feed back radio frequency signals appearing at the output of said second amplifier while attenuating signals of the signal frequency;

(*d*) a buffer amplifier coupled to the output of said second amplifier;

(*e*) a mixer amplifier coupled to the output of said buffer amplifier;

(*f*) a local oscillator having its output coupled to said mixer amplifier, said local oscillator being tuned to a predetermined oscillator frequency different than said signal frequency, the combination of said oscillator frequency with said signal frequency providing a heterodyne frequency within the audio range; and, (*g*) a low pass filter coupled to the output of said mixer amplifier, the cutoff frequency of said low pass filter being slightly above said heterodyne frequency.

2. A V.L.F. radio receiver comprising, in combination:

(*a*) an untuned radio frequency amplifier, said radio frequency amplifier having uniform amplification in the frequency range from 3 to 30 kc.;

(*b*) a multi-stage resistance coupled transistor amplifier coupled to the output of said radio frequency amplifier;

(*c*) a single frequency rejection filter having its input coupled to the output of said resistance coupled amplifier, said filter being tuned to the frequency of the signal to be received, the output of said filter being coupled to a suitable point in the input stage of said resistance coupled amplifier to inversely feed back radio frequency signals appearing at the output of said resistance coupled amplifier while attenuating signals of the signal frequency;

(*d*) a buffer amplifier coupled to the output of said resistance coupled amplifier;

(*e*) a mixer amplifier coupled to the output of said buffer amplifier;

(*f*) a local oscillator having its output coupled to said mixer amplifier, said local oscillator being tuned to a predetermined oscillator frequency different than said signal frequency, the combination of said oscillator frequency with said signal frequency providing a heterodyne frequency within the audio range; and, (*g*) a low pass filter coupled to the output of said mixer amplifier, the cutoff frequency of said low pass filter being slightly above said heterodyne frequency.

3. A V.L.F. radio receiver comprising, in combination:

(*a*) an untuned radio frequency amplifier, said radio frequency amplifier having uniform amplification in the frequency range from 3 to 30 kc.;

(*b*) a multi-stage resistance coupled transistor amplifier coupled to the output of said radio frequency amplifier;

(*c*) a single frequency rejection filter having its input coupled to the output of said resistance coupled amplifier, said filter being tuned to the frequency of the signal to be received, the output of said filter being coupled to a suitable point in the input stage of said resistance coupled amplifier to inversely feed back radio frequency signals appearing at the output of said resistance coupled amplifier while attenuating signals of the signal frequency;

(*d*) an impedance converter coupled intermediate the output of said rejection filter and the input of said multi-stage resistance coupled transistor amplifier, means in said rejection filter and multi-stage resistance coupled transistor amplifier for shifting the phase of the signal being fed back to said multi-stage resistance coupled transistor amplifier to produce a threshold regeneration effect to thereby substantially increase the gain of said multi-stage resistance coupled transistor amplifier;

(*e*) a buffer amplifier coupled to the output of said resistance coupled amplifier;

(*f*) a mixer amplifier coupled to the output of said buffer amplifier;

(*g*) a local oscillator having its output coupled to said mixer amplifier, said local oscillator being tuned to a predetermined oscillator frequency different than said signal frequency, the combination of said oscillator frequency with said signal frequency providing a heterodyne frequency within the audio range; and, (*h*) a low pass filter coupled to the output of said mixer amplifier, the cutoff frequency of said low pass filter being slightly above said heterodyne frequency.

4. In a V.L.F. receiver including a multi-stage resistance coupled transistor amplifier:

(*a*) a single frequency rejection filter having its input coupled to the output of said resistance coupled amplifier, said filter being tuned to the frequency of the signal to be received, the output of said filter being coupled to a suitable point in the input stage of said resistance coupled amplifier to inversely feed back radio frequency signals appearing at the output of said resistance coupled amplifier while attenuating signals of the signal frequency;

(*b*) an impedance converter coupled intermediate the output of said rejection filter and the input of said multi-stage resistance coupled transistor amplifier; and, (*c*) means in said rejection filter and multi-stage resistance coupled transistor amplifier for shifting the phase of the signal being fed back to said multi-stage resistance coupled transistor amplifier to produce a threshold regeneration effect to thereby substantially increase the gain of said multi-stage resistance coupled transistor amplifier.

5. A V.L.F. radio receiver comprising, in combination:

(*a*) a coil-wound ferrite core antenna;

(*b*) an untuned radio frequency amplifier coupled to said ferrite core antenna;

(*c*) a multi-stage resistance coupled transistor amplifier coupled to the output of said untuned radio frequency amplifier;

(*d*) a single frequency rejection filter having its input coupled to the output of said resistance coupled amplifier, said filter being tuned to the signal frequency, the output of said filter being coupled to a suitable point in the input stage of said resistance coupled amplifier to inversely feed back radio frequency signals appearing at the output of said resistance coupled amplifier while attenuating signals of said signal frequency;

(*e*) a buffer amplifier coupled to the output of said untuned amplifier;

(*f*) a mixer amplifier coupled to the output of said buffer amplifier;

(*g*) a local oscillator having its output coupled to said mixer amplifier, said local oscillator being tuned to a predetermined oscillator frequency different than said signal frequency, the combination of said oscillator frequency with said signal frequency providing a heterodyne frequency within the audio range; and, (*h*) a low pass filter coupled to the output of said mixer amplifier, the cutoff frequency of said low pass filter being slightly above said heterodyne frequency.

6. A V.L.F. radio receiver comprising, in combination:

(*a*) a coil-wound ferrite core antenna;

(*b*) an untuned radio frequency amplifier coupled to said ferrite core antenna, said amplifier including a variable capacitor stage, said stage and said antenna in combination being tuned to the frequency of the signal to be received;

(*c*) a multi-stage resistance coupled transistor amplifier coupled to the output of said untuned radio frequency amplifier;

(*d*) a single frequency rejection filter having its input coupled to the output of said resistance coupled amplifier, said filter being tuned to the signal frequency, the output of said filter being coupled to a suitable point in the input stage of said resistance coupled amplifier to inversely feed back radio frequency signals appearing at the output of said resistance coupled amplifier while attenuating signals of said signal frequency;

(*e*) a buffer amplifier coupled to the output of said untuned amplifier;

(*f*) a mixer amplifier coupled to the output of said buffer amplifier;

(*g*) a local oscillator having its output coupled to said mixer amplifier, said local oscillator being tuned to a predetermined oscillator frequency different than said signal frequency, the combination of said oscillator frequency with said signal frequency providing a heterodyne frequency within the audio range; and, (h) a low pass filter coupled to the output of said mixer amplifier, the cutoff frequency of said low pass filter being slightly above said heterodyne frequency.

7. A V.L.F. receiver as defined in claim 1 further including means coupled intermediate said untuned amplifier and said resistance coupled amplifier, said means being adapted to selectively reject a strong V.L.F. signal different from said signal frequency to thereby permit said receiver to receive a relatively weaker signal at said signal frequency.

8. A V.L.F. radio receiver comprising, in combination:

(a) an untuned radio frequency amplifier, including variable capacitance means in the input thereof;

(b) a coil-wound ferrite core antenna, said antenna in combination with said variable capacitance means being tuned to a predetermined signal frequency in the range from 3 to 30 kc.;

(c) a multi-stage resistance coupled transistor amplifier coupled to the output of said untuned radio frequency amplifier;

(d) a single frequency rejection filter having its input coupled to the output of said resistance coupled amplifier, said filter being tuned to said predetermined signal frequency, the output of said filter being coupled to a suitable point in the input stage of said resistance coupled amplifier to inversely feed back radio frequency signals appearing at the output of said resistance coupled amplifier while attenuating signals of said predetermined signal frequency;

(e) a buffer amplifier coupled to the output of said resistance coupled amplifier;

(f) a mixer amplifier coupled to the output of said buffer amplifier;

(g) a local oscillator having its output coupled to said mixer amplifier, said local oscillator being tuned to a predetermined oscillator frequency different than said signal frequency, the combination of said oscillator frequency with said signal frequency providing a heterodyne frequency within the audio range;

(h) a low pass filter coupled to the output of said mixer amplifier, the cutoff frequency of said low pass filter being slightly above said heterodyne frequency; and, (i) an audio amplifier coupled to the output of said low pass filter.

9. A V.L.F. radio receiver comprising, in combination:

(a) an untuned radio frequency amplifier;

(b) a coil-wound ferrite core antenna;

(c) a multi-stage resistance coupled transistor amplifier coupled to the output of said untuned radio frequency amplifier;

(d) a bridged-T notch filter having its input coupled to the output of said resistance coupled amplifier, said filter being tuned to said predetermined signal frequency, the output of said filter being coupled through impedance matching means to a suitable point to the input stage of said resistance coupled amplifier to inversely feed back radio frequency signals appearing at the output of said resistance coupled amplifier while attenuating signals of said predetermined signal frequency;

(e) a buffer amplifier coupled to the output of said resistance coupled amplifier;

(f) a mixer amplifier coupled to the output of said buffer amplifier;

(g) a local oscillator having its output coupled to said mixer amplifier, said local oscillator being tuned to a predetermined oscillator frequency different than said signal frequency, the combination of said oscillator frequency with said signal frequency producing a heterodyne frequency within the audio range;

(h) a low-pass filter coupled to the output of said mixer stage, the cutoff frequency of said low-pass filter being slightly above said heterodyne frequency; and, (i) an audio amplifier coupled to the output of said low-pass filter.

10. A V.L.F. radio receiver comprising, in combination:

(a) an untuned radio frequency amplifier, including variable capacitance means in the input thereof;

(b) a coil-wound ferrite core antenna, said antenna in combination with said variable capacitance means being tuned to a predetermined signal frequency in the range from 3 to 30 kc.;

(c) a multi-stage untuned transistor amplifier resistance coupled to the output of said tuned radio frequency amplifier;

(d) a single frequency rejection filter having its input coupled to the output of said untuned amplifier, said filter being tuned to attenuate signals of said predetermined signal frequency, the output of said filter being coupled to the input stage of said untuned amplifier to inversely feed back radio frequency signals appearing at the output of said untuned amplifier while attenuating signals of said predetermined signal frequency;

(e) a buffer transistor amplifier resistance coupled to the output of said untuned amplifier;

(f) a mixer transistor amplifier resistance coupled to the output of said buffer amplifier;

(g) a local oscillator having its output resistance coupled to said mixer amplifier, said local oscillator being tuned to a predetermined oscillator frequency different than said signal frequency, the combination of said oscillator frequency and said signal frequency producing a heterodyne frequency within the audio range;

(h) a low-pass filter coupled to the output of said mixer amplifier, the cutoff frequency of said low-pass filter being slightly above said heterodyne frequency; and, (i) an audio amplifier coupled to the output of said low-pass filter.

11. In a radio receiver for the reception of V.L.F. radio signals of a first predetermined frequency in the presence of strong V.L.F. radio signals of a second predetermined frequency different from said first predetermined frequency:

(a) a first untuned radio frequency amplifier having substantially uniform amplification in the frequency range of from about 3 kc. to about 30 kc.;

(b) a single frequency rejection filter having its input coupled to the output of said first untuned radio frequency amplifier, said rejection filter being tuned to said second predetermined frequency;

(c) a second untuned radio frequency amplifier having substantially uniform amplification in the frequency range of from about 3 kc. to about 30 kc.; and, (d) impedance matching means coupling the output of said single frequency rejection filter to the input of said second untuned radio frequency amplifier.

12. A radio receiver for the reception of V.L.F. radio signals of a first predetermined frequency in the presence of strong V.L.F. radio signals of a second predetermined frequency different from said first predetermined frequency, said radio receiver comprising, in combination:

(a) a first untuned radio frequency amplifier having substantially uniform amplification in the frequency range from 3 to 30 kc.;

(b) a first single frequency rejection filter having its input coupled to the output of said first untuned radio frequency amplifier, said first rejection filter being tuned to said second predetermined frequency;

(c) a second untuned radio frequency amplifier having substantially uniform amplification in the frequency range from 3 to 30 kc.;

(*d*) impedance matching means coupling the output of said first single frequency rejection filter to the input of said second untuned radio frequency amplifier;

(*e*) a second single frequency rejection filter having its input coupled to the output of said second amplifier, said second rejection filter being tuned to said first predetermined frequency, the output of said second rejection filter being coupled to a suitable point in the input of said second untuned amplifier to inversely feed back radio frequency signals appearing at the output of said second untuned amplifier while attenuating signals of said first predetermined frequency;

(*f*) a buffer amplifier coupled to the output of said second untuned amplifier;

(*g*) a mixer amplifier coupled to the output of said buffer amplifier;

(*h*) a local oscillator having its output coupled to said mixer amplifier, said local oscillator being tuned to a predetermined oscillator frequency different from said first predetermined frequency, the combination of said oscillator frequency with said first predetermined frequency providing a heterodyne frequency within the audio range; and, (*i*) a low pass filter coupled to the output of said mixer amplifier, the cutoff frequency of said low pass filter being slightly above said heterodyne frequency.

13. A radio receiver for the reception of V.L.F. radio signals of a first predetermined frequency in the presence of strong V.L.F. radio signals of a second predetermined frequency different from said first predetermined frequency, said radio receiver comprising, in combination:

(*a*) a first untuned radio frequency transistor amplifier having substantially uniform amplification in the frequency range from 3 to 30 kc.;

(*b*) a first single frequency rejection filter having its input coupled to the output of said first untuned radio frequency transistor amplifier, said first rejection filter being tuned to said second predetermined frequency;

(*c*) a second untuned radio frequency transistor amplifier having substantially uniform amplification in the frequency range from 3 to 30 kc.;

(*d*) impedance multiplier means coupling the relatively low impedance input of said second transistor amplifier to the relatively high impedance output of said first single frequency rejection filter;

(*e*) a second single frequency rejection filter having its input coupled to the output of said second amplifier, said second rejection filter being tuned to said first predetermined frequency, the output of said second rejection filter being coupled to a suitable point in the input of said second untuned amplifier to inversely feed back radio frequency signals appearing at the output of said second untuned amplifier while attenuating signals of said first predetermined frequency;

(*f*) a buffer amplifier coupled to the output of said second untuned amplifier;

(*g*) a mixer amplifier coupled to the output of said buffer amplifier;

(*h*) a local oscillator having its output coupled to said mixer amplifier, said local oscillator being tuned to a predetermined oscillator frequency different from said first predetermined frequency, the combination of said oscillator frequency with said first predetermined frequency providing a heterodyne frequency within the audio range; and, (*i*) a low pass filter coupled to the output of said mixer amplifier, the cutoff frequency of said low pass filter being slightly above said heterodyne frequency.

14. In a radio receiver for the reception of V.L.F. radio signals of a first predetermined frequency in the presence of strong V.L.F. radio signals of a second predetermined frequency:

(*a*) a first untuned radio frequency amplifier having substantially uniform amplification in the frequency range of from about 3 kc. to about 30 kc.;

(*b*) a first single frequency rejection filter having its input coupled to the output of said first untuned radio frequency amplifier, said first rejection filter being tuned to said second predetermined frequency;

(*c*) a multi-stage resistance coupled transistor amplifier;

(*d*) impedance multiplier means coupling the relatively low impedance input of said transistor amplifier to the relatively high impedance output of said first rejection filter;

(*e*) a second single frequency rejection filter having its input coupled to the output of said resistance coupled amplifier, said second rejection filter being tuned to said first predetermined frequency, the output of said second rejection filter being coupled to a suitable point in the input stage of said resistance coupled amplifier to inversely feed back radio frequency signals appearing at the output of said resistance coupled amplifier while attenuating signals of said first predetermined frequency;

(*f*) an impedance converter coupled intermediate the output of said second rejection filter and the input of said multi-stage resistance coupled transistor amplifier; and, (*g*) means in said second rejection filter and said multi-stage resistance coupled transistor amplifier for shifting the phase of the signals being fed back to said multi-stage resistance coupled transistor amplifier to produce a threshold regeneration effect to thereby substantially increase the gain of said multi-stage resistance coupled transistor amplifier.

No references cited.